(12) United States Patent
Friedman et al.

(10) Patent No.: US 11,072,079 B1
(45) Date of Patent: Jul. 27, 2021

(54) SUCTION POWERED PICK-UP STICK (71) Applicants: Roberta Barbara Friedman, Glenview, IL (US); Norman David Friedman, Glenview, IL (US); Lori Sue Mottlowitz, Highland Park, IL (US)

(72) Inventors: Roberta Barbara Friedman, Glenview, IL (US); Norman David Friedman, Glenview, IL (US); Lori Sue Mottlowitz, Highland Park, IL (US)

(73) Assignee: ORANGETHERAPY LLC, Highland Park, IL (US)

( * ) Notice: Subject to any disclaimer, the term of this patent is extended or adjusted under 35 U.S.C. 154(b) by 0 days.

(21) Appl. No.: 16/938,563

(22) Filed: Jul. 24, 2020

(51) Int. Cl.
　*B25J 15/06*　　(2006.01)
　*B25J 1/04*　　(2006.01)
　*E01H 1/12*　　(2006.01)
　*B25J 18/02*　　(2006.01)

(52) U.S. Cl.
　CPC ............ *B25J 15/0616* (2013.01); *B25J 1/04* (2013.01); *B25J 18/025* (2013.01); *E01H 1/12* (2013.01); *E01H 2001/1266* (2013.01); *E01H 2001/1293* (2013.01)

(58) Field of Classification Search
　CPC ... B25J 1/02; B25J 1/04; B25J 15/0616; B25J 18/025; B25B 11/007; E01H 1/12; E01H 2001/1266; E01H 2001/1293
　See application file for complete search history.

(56) References Cited

U.S. PATENT DOCUMENTS

| | | | | |
|---|---|---|---|---|
| 2,355,322 A | * | 8/1944 | Nuffer | A47L 5/24 15/344 |
| 2,922,873 A | * | 1/1960 | Bibbero | G01M 11/081 356/241.1 |
| 4,074,458 A | * | 2/1978 | Catlett | A01M 1/06 15/344 |
| 4,527,824 A | * | 7/1985 | Rosenfeld | A45B 3/00 135/66 |
| 4,622,766 A | | 11/1986 | Hall | |
| 4,625,742 A | * | 12/1986 | Phillips | A45B 3/04 135/66 |
| 5,273,329 A | | 12/1993 | Wessel | |
| 5,290,082 A | * | 3/1994 | Palmer | B25B 11/007 29/743 |
| 5,771,531 A | * | 6/1998 | Swartz | A47L 5/24 15/324 |

(Continued)

*Primary Examiner* — Dean J Kramer (57) ABSTRACT

It is an objective of the present invention to provide users with a pick-up stick, that can pick up flat objects from the floor that are difficult to grab or reach. In order to accomplish that, the present invention comprises a battery operated, suction powered pick-up stick that is also retractable. According to the present invention, with the push of a button on the handle, the suction may be turned on and turned off. Further, the retractability and the low weight of the present invention enables a user to collapse and carry the pick-up stick in a small purse/pouch. Additionally, the present invention comprises one or more light at the tip of the pick-up stick for easy visibility. The present invention further comprises a tip that bends and flexes so that suction may be initiated from a desired direction and a grab is made efficiently.

13 Claims, 12 Drawing Sheets

(56) References Cited

U.S. PATENT DOCUMENTS

| | | | |
|---|---|---|---|
| 6,066,211 A * | 5/2000 | Sandell | A47L 9/2873 |
| | | | 134/21 |
| 6,457,758 B1 | 10/2002 | Gerdes | |
| 6,669,254 B2 | 12/2003 | Thom et al. | |
| 7,367,347 B2 * | 5/2008 | Field | A45B 7/00 |
| | | | 135/66 |
| 9,832,980 B2 | 12/2017 | Kovarik et al. | |
| 2007/0114806 A1 | 5/2007 | Ferguson | |
| 2017/0105591 A1 * | 4/2017 | Bernhard-Tanis | A47L 5/24 |
| 2017/0135539 A1 * | 5/2017 | Regina | A47L 5/24 |
| 2018/0015612 A1 * | 1/2018 | Price | B25B 11/007 |

* cited by examiner

SUCTION POWERED PICK-UP STICK

FIELD OF THE INVENTION

The present invention relates generally to a pick-up stick. More specifically, the present invention relates to a retractable pick-up stick that is powered by a suction motor.

BACKGROUND OF THE INVENTION

People play cards all over the world. When cards fall to the ground it is difficult to pick them up especially if you need to stay at the table. A pick-up stick, reach extender, grabber arm, or helping hand is a handheld mechanical tool that is used to increase the range of a person's reach when grabbing objects. It has applications in waste management, assistive technology, gardening and outdoor work, etc. However, most of these pick-up sticks cannot pick up flat things such as playing cards, and/or tiny things, such as a piece of jewelry from the ground. Thus, a pick-up stick that can pick up flat and small things without folding or deforming them, as well as retract and collapse to fit into a small purse is a rare find in the current.

It is an objective of the present invention to provide users with a pick-up stick that can pick up flat objects from the floor that are difficult to grab or reach, such as playing cards lying flat on the ground or any flat object that cannot be picked up with a magnet or grabbed with a claw. In order to accomplish that, the present invention comprises a battery operated, suction powered pick-up stick that is also retractable. According to the present invention, the suction power is strong enough to extend through the length of a long stick, such that with the push of a button on the handle, the suction begins and object/s at the tip of the stick will be suctioned inwards. Further, once the button is released the suction stops, thereby releasing the object at the tip of the stick. Furthermore, the collapsibility and the low weight of the present invention enables a user to fold and carry the pick-up stick in a small purse/pouch. Additionally, the present invention comprises one or more light at the tip of the pick-up stick for easy visibility of the items that need to be picked up. The present invention further comprises a tip that bends and flexes, so that suction may be initiated from a desired direction and an efficient grab is made quickly. Thus, the present invention is a compact and efficient pick-up stick, that will be a useful addition for game tables such as in casinos, as well as a great pick-up tool in general for finding and grabbing small things from difficult to access places.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 12, the present invention is a suction powered pick-up stick. It is an objective of the present invention to provide users with a pick-up stick that can pick up flat objects from the floor that are difficult to grab or reach, such as playing cards lying flat on the ground or any flat object that cannot be picked up with a magnet or grabbed with a claw. In order to accomplish that, the present invention comprises a battery operated, suction powered pick-up stick that is also retractable and collapsible. According to the present invention, the suction power is strong enough to extend through the length of a long stick, such that with the push of a button on the handle, the suction begins and object/s at the tip of the stick will be suctioned/pulled inwards. Further, once the button is released the suction stops, thereby releasing the object at the tip of the stick. Furthermore, the collapsibility and the low weight of the present invention enables a user to fold and carry the pick-up stick in a small purse/pouch. Additionally, the present invention comprises one or more light at the tip of the pick-up stick for easy visibility. The present invention further comprises a tip that bends and flexes when needed, so that suction may be initiated from a desired direction and a grab may be made efficiently. Thus, the present invention is a compact and efficient pick-up stick, that will be a useful addition for card players, as well as a great pick-up tool in general for finding and grabbing small things from difficult to access places.

Figure 7:
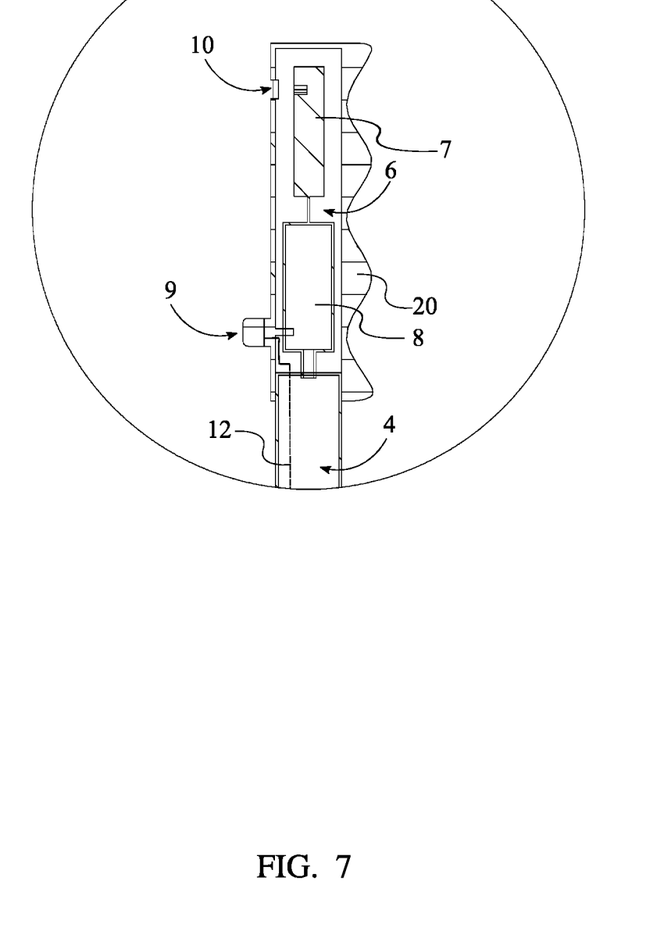
FIG. 7 is a detailed view of section 7 of FIG. 6.

The following description is in reference to FIG. 1 through FIG. 12. It is an aim of the present invention to provide users with a pick-up stick, that can pick up flat objects from the floor that are difficult to grab or reach. In order to accomplish that, the present invention comprises a handle 1, a shaft 2, a tip 3, and a suction channel 4. The handle 1, the shaft 2, and the tip 3 may comprise any size, shape, material, orientation, components or arrangement of components, as long as the objectives and intended purpose of the present invention are fulfilled. However, it is preferred that, the handle 1, shaft 2, and tip 3 comprise an overall cylindrical shape and are made of light-weight durable materials. According to a preferred embodiment of the present invention, the handle 1 further comprises a casing 5, an inner cavity 6, a battery 7, a suction motor 8, and a human interface device (HID) 9. As seen in FIG. 7, the inner cavity 6 traverses into the casing 5, such that the casing 5 may hold the necessary internal components for the functioning of the present invention in a concealed fashion within the inner cavity 6. Accordingly, the battery 7 and the suction motor 8 are mounted within the inner cavity 6. The battery 7 is used to deliver electrical power to the suction motor 8. It is preferred that the battery 7 is rechargeable and fits within the dimensions of the casing 5. However, any other source of power, or a combination of the following power sources may be employed for the smooth functioning of the suction powered pick-up stick. Examples of such power sources include, but are not limited to, Li ion batteries, magnetic power converters, solar power converters etc.

As seen in FIG. 1, FIG. 2, FIG. 3, FIG. 6, and FIG. 7, the HID 9 is laterally mounted onto the casing 5, so that the user may easily access the HID 9 for performing the various operations associated with the HID 9. In order to accomplish that, the HID 9 and the battery 7 are electrically coupled to the suction motor 8, wherein interacting with the HID 9 governs the operation of the suction motor 8. Preferably, the HID 9 comprises one or more push buttons. However, the HID 9 may comprise any other shape, size, and/or technology that are known to one of ordinary skill in the art, as long as the intended purpose of the present invention is not hindered. Further, the suction motor 8 may comprise any brand, size, or power, as long as the suction motor 8 fits within the dimensions of the casing 5 and fulfills the intends of the present invention.

According to the preferred embodiment, the suction channel 4 longitudinally traverses through the shaft 2, so as to provide an obstacle-free path and smooth flow channel for the suction process to happen within the pick-up stick. Further, the handle 1 is terminally connected to the shaft 2 and the tip 3 is terminally connected to the shaft 2, opposite to the handle 1. This is so that, by operating the HID 9 in the handle 1, the user may actuate the suction motor 8 and introduce suction at the tip 3 of the pick-up stick, wherein the suction extends all the way through the suction channel 4. In other words, the tip 3 is in fluid communication with the suction motor 8 through the suction channel 4, wherein the suction motor 8 induces a pressure differential that draws particulate matter into the suction channel 4.

Continuing with the preferred embodiment of the present invention, the handle 1 comprises a charging port 10, for ease of charging the battery 7 externally. Preferably, the charging port 10 is a small inlet for any charging wire to connect to the battery 7, such as a USB port. However, any other charging mechanisms that are known to one of ordinary skill in art may be employed, as long as the intended purpose of the present invention is not altered. Further, the charging port 10 is integrated into the casing 5, so as to enable the user to access the battery 7 and charge the battery 7 easily and externally through the outer surface of the casing 5. Furthermore, the charging port 10 is electrically coupled to the battery 7, such that charging the battery 7 enables the battery 7 to store and provide enough energy for the smooth functioning of the present invention.

As seen in FIG. 1 through FIG. 12, the shaft 2 is collapsible and retractable. Preferably, the shaft 2 may retract to a length ranging between 24" and 30", and collapse into approximately 6" in length. However, a shaft having any other range of length will also fall under the scope of the present invention. Further, the shaft 2 comprises multiple cylindrical segments with varying radii, such that the radius of each segment decreases, as they traverse from the handle 1 to tip 3. This enables the multiple segments to slide within one another in the collapsed mode, thereby reducing the length of the pick-up stick to almost that of the handle 1, with just the tip 3 protruding outside the handle 1. Similarly, in order to retract the pick-up stick, the tip 3 may be pulled out, which results in extension of each of the multiple segments of the shaft 2, from within the other segments and the handle 1. However, it should be noted that, any other method/technique that are known to one of ordinary skill in the art, that may be used to retract and collapse the shaft 2, would fall under the scope of the present invention, as long the objective of the invention remains the same.

It is an aim of the present invention to be able to use suction power from different angles or directions, so as to efficiently pick the object near the tip 3 of the pick-up stick. In order to accomplish that, the tip 3 comprises an articulated tube 11, or a tube that allows bending and flexing. Further, in order to control the bending and flexing of the tip 3 from the handle 1, the present invention comprises an actuation device 12. The actuation device 12 may be a simple string or spring that is integrated into the articulated tube 11, such that pulling the string would bend the articulated tube 11 and hence the tip 3 of the pick-up stick. In other words, the actuation device 12 is operatively coupled to the articulated tube 11, wherein the actuation device 12 is able to modify the shape of the articulated tube 11. In order to access the functioning of the articulated tube 11 from the handle 1, the actuation device 12 is electronically coupled to the HID 9. However, it should be noted that, any other actuation device 12 and/or method that are known to one of ordinary skill in the art may be employed for bending the tip 3 of the pick-up stick from the handle 1.

Figure 8:
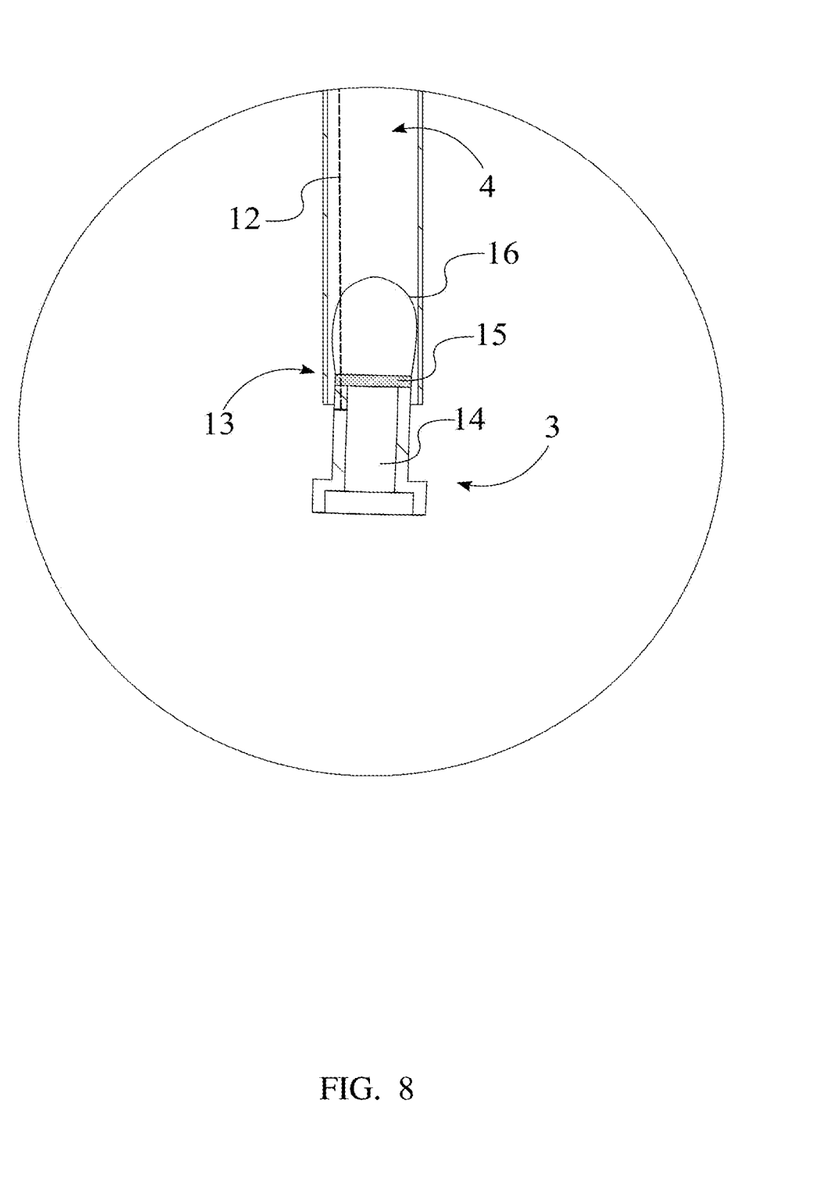
FIG. 8 is a detailed view of section 8 of FIG. 6.
Figure 9:
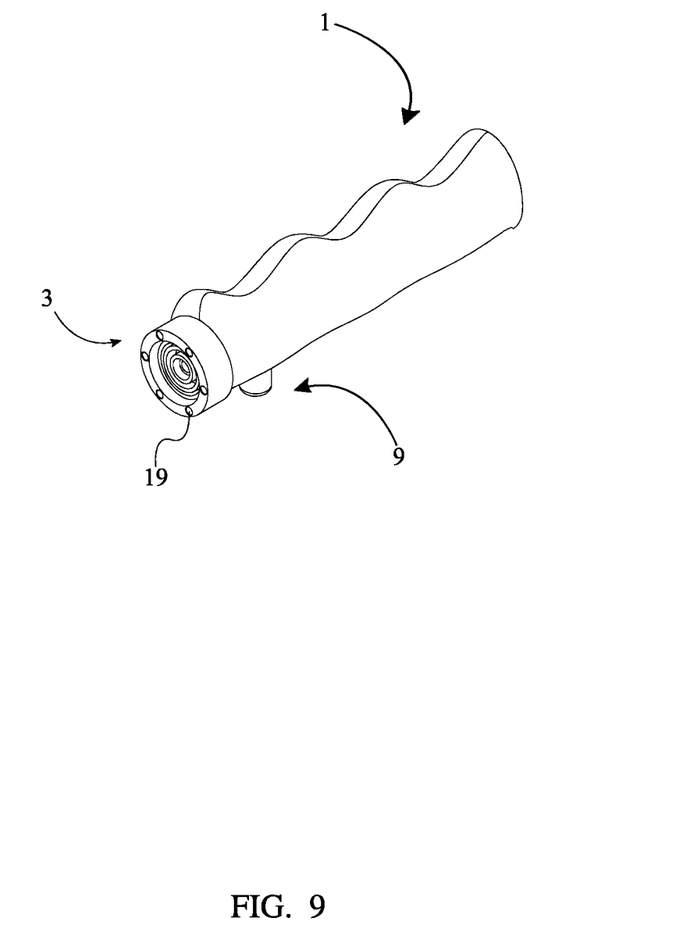
FIG. 9 is a perspective view, wherein the present invention is in a collapsed mode.
Figure 10:
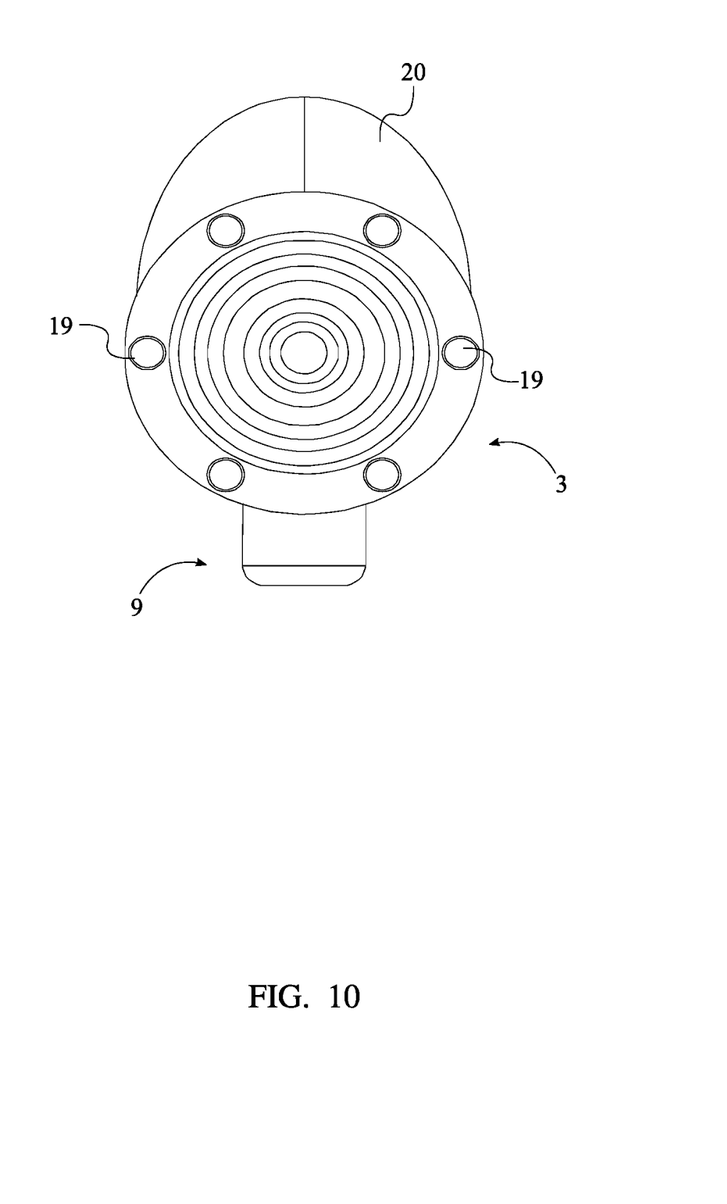
FIG. 10 is a bottom view of the present invention in FIG. 9.
Figure 11:
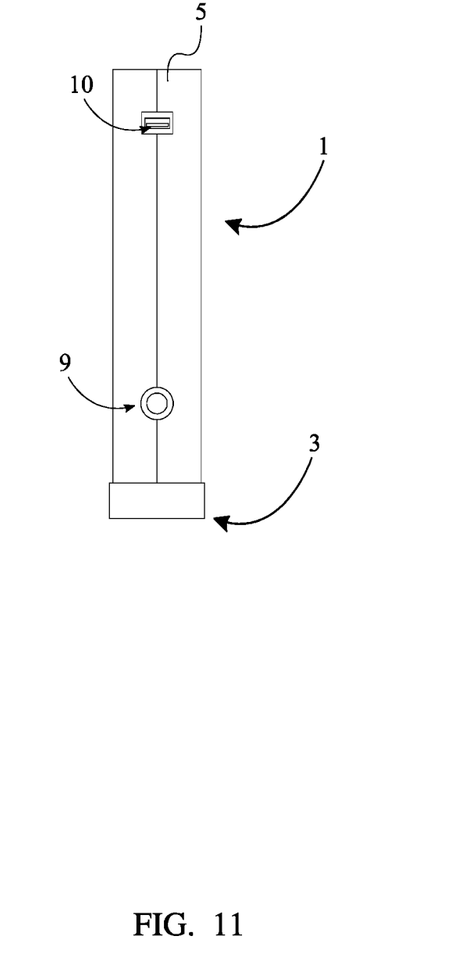
FIG. 11 is a rear elevational view of the present invention in FIG. 9.

In a first alternate embodiment of the present invention, the pick-up stick comprises a collection unit 13, such that smaller particles that pass through the aperture of the tip 3 may be collected. As seen in FIG. 8, the collection unit 13 is connected in between the tip 3 and the shaft 2. According to this embodiment, the tip 3 is in fluid communication with the shaft 2 through the collection unit 13, such that collection unit 13 does not hinder with the smooth functioning of the suction process and flow of the suction channel 4. Further, according to this embodiment, the collection unit 13 comprises a transfer tube 14, a filter 15 and a debris trap 16. As seen in FIG. 8, the transfer tube 14 is connected in between the tip 3 and the shaft 2, such that any particulate matter that enters through the tip 3, passes through the transfer tube 14 before entering the shaft 2. Furthermore, the filter 15 is mounted within the shaft 2, such that the filter 15 lets in particulate matter of a specific size, but do not let them fall out into the ground when the suction motor 8 stops. In order to ensure smooth functioning of the suction induced pick-up stick, the tip 3 remains in fluid communication with the suction channel 4 through the filter 15. Additionally, as seen in FIG. 8, the debris trap 16 is operatively coupled to the transfer tube 14, wherein the debris trap 16 prevents particulate matter that is sucked into the tip 3 from traveling into the shaft 2. This prevents any particles from entering the handle 1 and messing with the suction motor 8 or the battery 7. Thus, the collection unit 13 enables the user to find and collect hard to find objects such as a small piece or jewelry, a screw etc., without hindering with the functioning of the pick-up stick.

Figure 12:
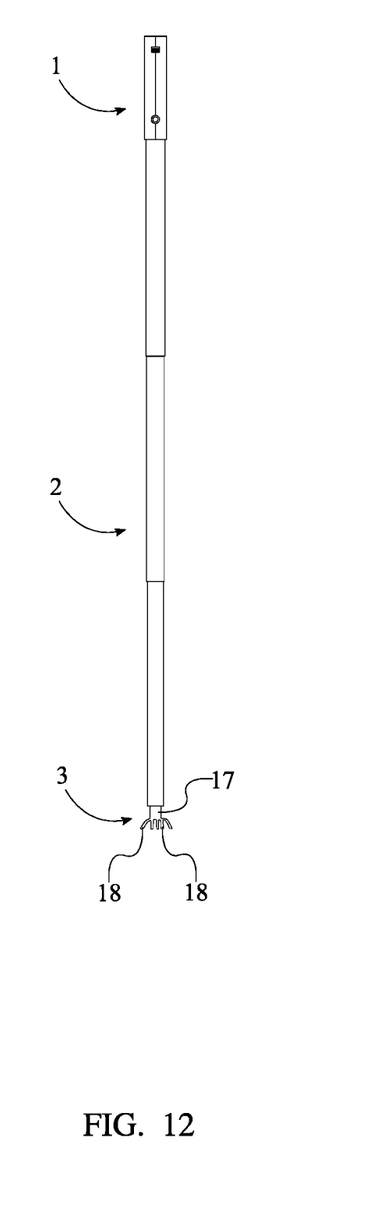
FIG. 12 is a rear elevational view of an alternate embodiment of the present invention.

In a second alternate embodiment of the present invention, the tip 3 comprises a manifold 17 and a plurality of suction tubes 18. As seen in FIG. 12, the manifold 17 is connected in between the plurality of suction tubes 18 and the shaft 2. This arrangement of the tip 3 helps in picking up multiple objects simultaneously. Accordingly, in this alternate embodiment, each of the plurality of suction tubes 18 is in fluid communication with the suction motor 8 through the manifold 17 and the suction channel 4, thereby enabling to create a pressure difference at the tip of each of the plurality of suction tubes 18.

Figure 1:
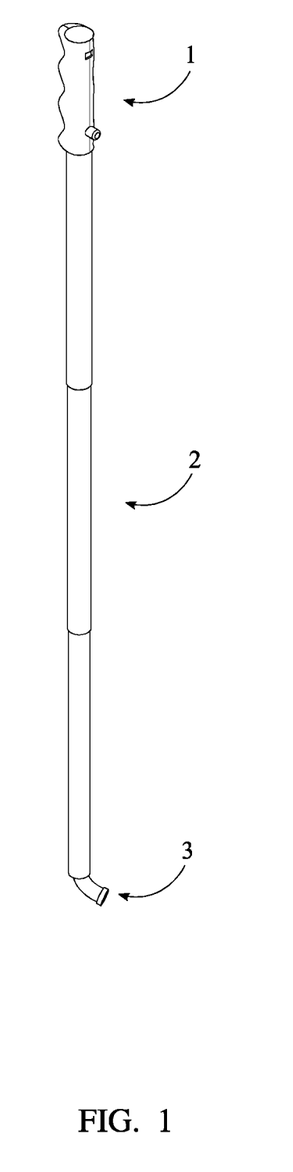
FIG. 1 is a top-front-left perspective view, wherein the present invention is in a retracted mode having a bent tip.
Figure 2:
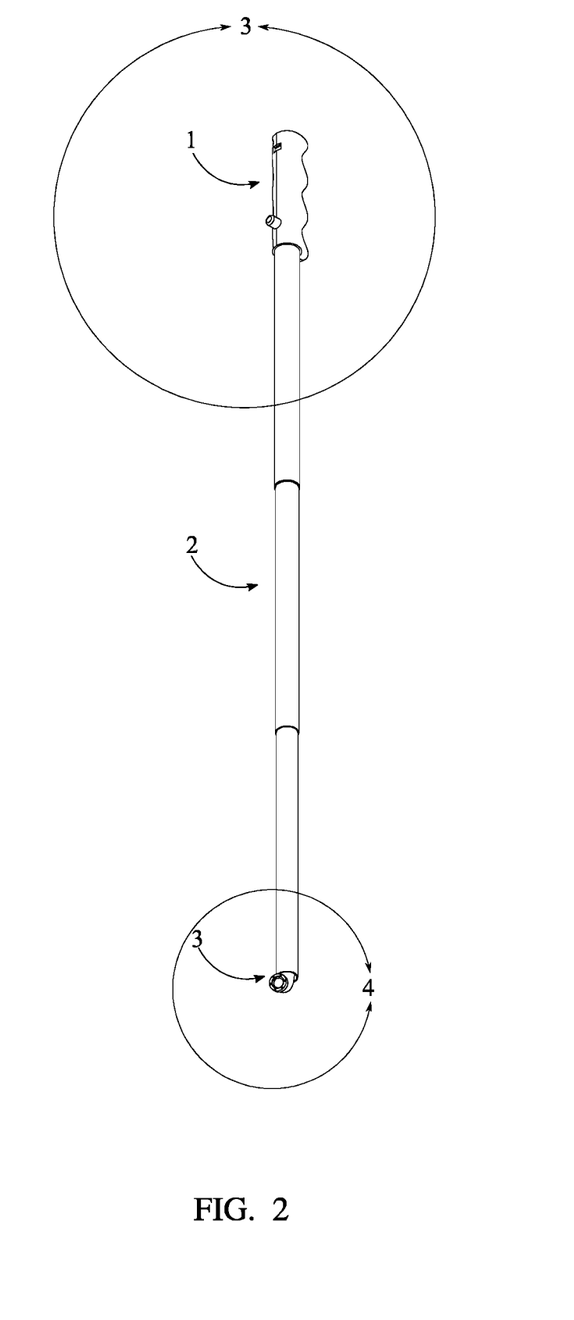
FIG. 2 is a bottom-rear-right perspective view of the present invention in FIG. 1.
Figure 3:
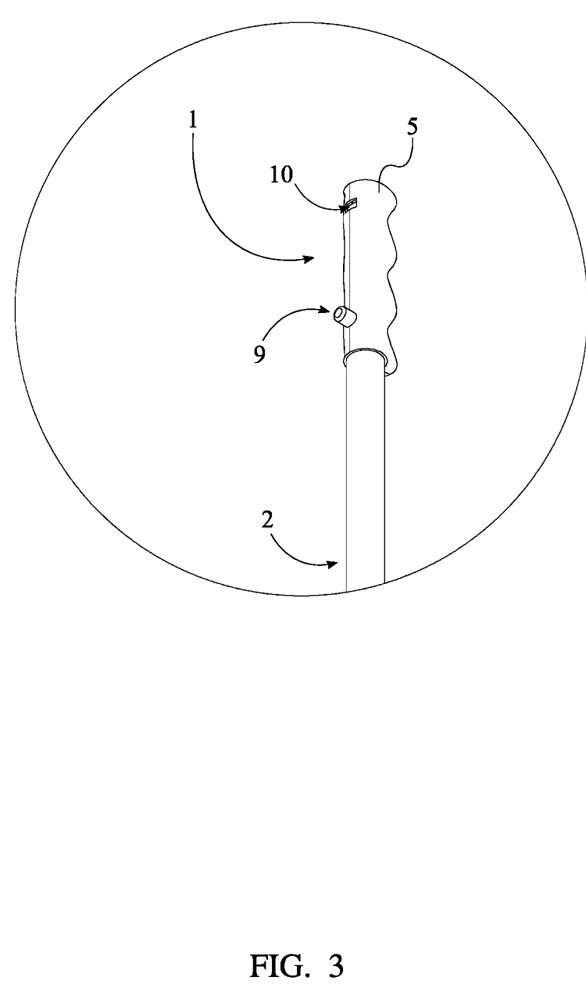
FIG. 3 is a detailed view of section 3 of FIG. 2.
Figure 4:
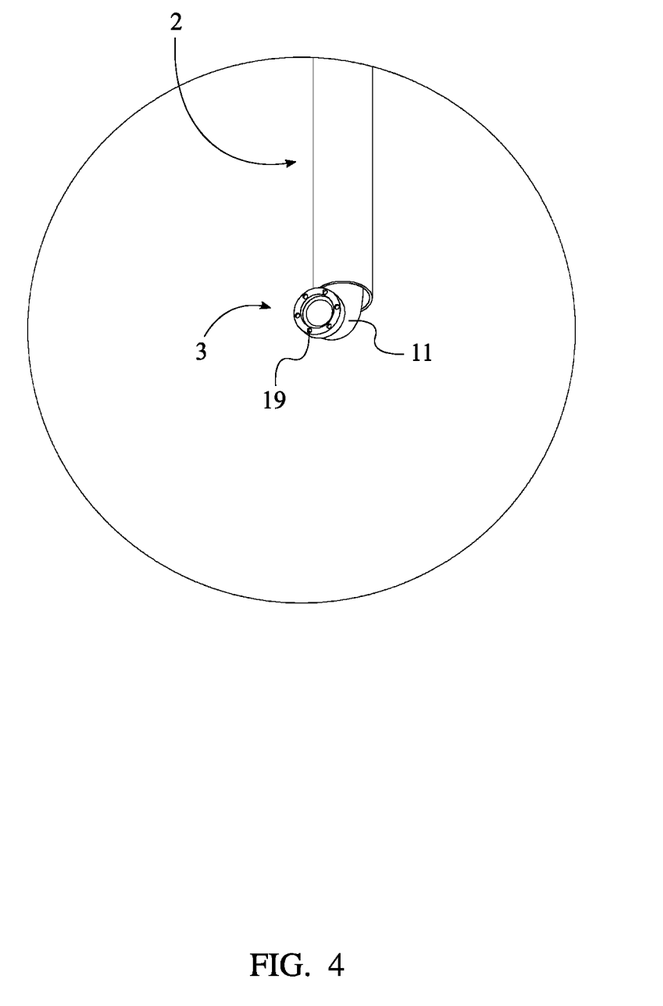
FIG. 4 is a detailed view of section 4 of FIG. 2.
Figure 5:
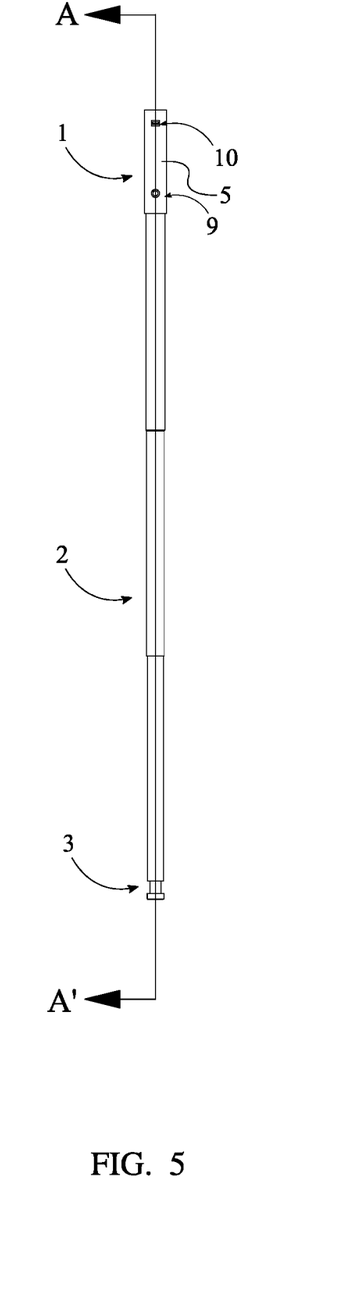
FIG. 5 is a rear elevational view of the present invention, with a straight tip.
Figure 6:
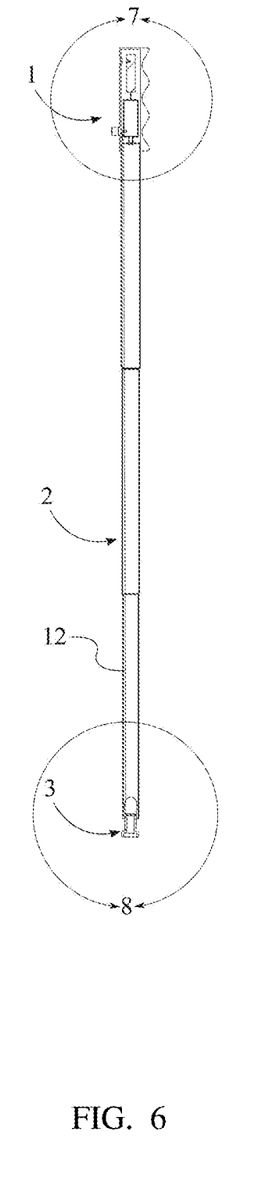
FIG. 6 is a sectional view of the present invention, taken along A-A' of FIG. 5.

Continuing with the preferred embodiment, the present invention comprises a light 19. As seen in FIG. 4, the light 19 is mounted onto the tip 3 in a ring like fashion, such that it provides improved visibility to the user while using the pick-up stick. Preferably, the light 19 is a ring of multiple LED lights. However, any other form of light that is known to one or ordinary skill in the art, and which will not hinder the intended purpose of the present invention may be employed. Further, the light 19 is electrically connected to the battery 7, such that the battery 7 provides the energy needed for the light 19.

As clearly seen in FIG. 7, the handle 1 comprises an ergonomic grip 20. However, the handle 1 may comprise any other grip that is known to one of ordinary skill in the art, as long as the intents of the present invention is not hindered.

Although the invention has been explained in relation to its preferred embodiment, it is to be understood that many other possible modifications and variations can be made without departing from the spirit and scope of the invention as hereinafter claimed.

What is claimed is:

1. A suction induced pick-up stick comprising:
a handle;
a shaft;
a tip;
a suction channel;
the handle comprising a casing, an inner cavity, a battery, a suction motor, and a human interface device (HID);
the inner cavity traversing into the casing;
the battery and the suction motor being mounted within the inner cavity;
the HID being laterally mounted onto the casing;
the HID and the battery being electrically coupled to the suction motor;
wherein interacting with the HID governs the operation of the suction motor;
the suction channel longitudinally traversing through the shaft;
the handle being terminally connected to the shaft;
the tip being terminally connected to the shaft, opposite to the handle;
the tip being in fluid communication with the suction motor through the suction channel, wherein the suction motor induces a pressure differential that draws particulate matter into the suction channel;
the tip being an articulated tube;
an actuation device;
the actuation device being integrated into the articulated tube;
the actuation device being operatively coupled to the articulated tube, wherein the actuation device is able to modify the shape of the articulated tube; and
the actuation device being electronically coupled to the HID.

2. The pick-up stick of claim 1, further comprising:
the handle comprising a charging port;
the charging port being integrated into the casing; and
the charging port being electrically coupled to the battery.

3. The pick-up stick of claim 1, wherein the battery is rechargeable.

4. The pick-up stick of claim 1, wherein the shaft is collapsible and retractable.

5. The pick-up stick of claim 1, comprising:
a collection unit;
the collection unit being connected in between the tip and the shaft;
the tip being in fluid communication with the shaft through the collection unit.

6. The pick-up stick of claim 1, comprising:
the collection unit comprising a transfer tube, a filter and a debris trap;
the transfer tube being connected in between the tip and the shaft;
the filter being mounted within the shaft;
the tip being in fluid communication with the suction channel through the filter; and
the debris trap being operatively coupled to the transfer tube, wherein the debris trap prevents particulate matter that is sucked into the tip from traveling into the shaft.

7. The pick-up stick of claim 1, comprising:
a light;
the light being mounted onto the tip; and
the light being electrically connected to the battery.

8. The pick-up stick of claim 1, wherein the handle comprises an ergonomic grip.

9. A suction induced pick-up stick comprising:
a handle;
a shaft;
a tip;
a suction channel;
the handle comprising a casing, an inner cavity, a battery, a suction motor, and a human interface device (HID);
the inner cavity traversing into the casing;
the battery and the suction motor being mounted within the inner cavity;
the HID being laterally mounted onto the casing;
the HID and the battery being electrically coupled to the suction motor;
wherein interacting with the HID governs the operation of the suction motor;
the suction channel longitudinally traversing through the shaft;
the handle being terminally connected to the shaft, wherein the shaft is collapsible and retractable;
the tip being terminally connected to the shaft, opposite to the handle;
the tip being in fluid communication with the suction motor through the suction channel, wherein the suction motor induces a pressure differential that draws particulate matter into the suction channel;
the tip being an articulated tube;
an actuation device;
the actuation device being integrated into the articulated tube;
the actuation device being operatively coupled to the articulated tube, wherein the actuation device is able to modify the shape of the articulated tube; and
the actuation device being electronically coupled to the HID.

10. The pick-up stick of claim 9, further comprising:
the handle comprising a charging port;
the charging port being integrated into the casing; and
the charging port being electrically coupled to the battery, wherein the battery is rechargeable.

11. The pick-up stick of claim 9, comprising:
a collection unit;
the collection unit being connected in between the tip and the shaft;
the tip being in fluid communication with the shaft through the collection unit;
the collection unit comprising a transfer tube, a filter and a debris trap;
the transfer tube being connected in between the tip and the shaft;
the filter being mounted within the shaft;
the tip being in fluid communication with the suction channel through the filter; and
the debris trap being operatively coupled to the transfer tube, wherein the debris trap prevents particulate matter that is sucked into the tip from traveling into the shaft.

12. The pick-up stick of claim 9, comprising:
a light;
the light being mounted onto the tip; and
the light being electrically connected to the battery.

13. The pick-up stick of claim 9, wherein the handle comprises an ergonomic grip.

\* \* \* \* \*